Aug. 28, 1928.  
J. L. SHUE  
1,682,354  
BATCH HOPPER FOR CONCRETE MATERIAL  
Filed Jan. 27, 1927  3 Sheets-Sheet 2
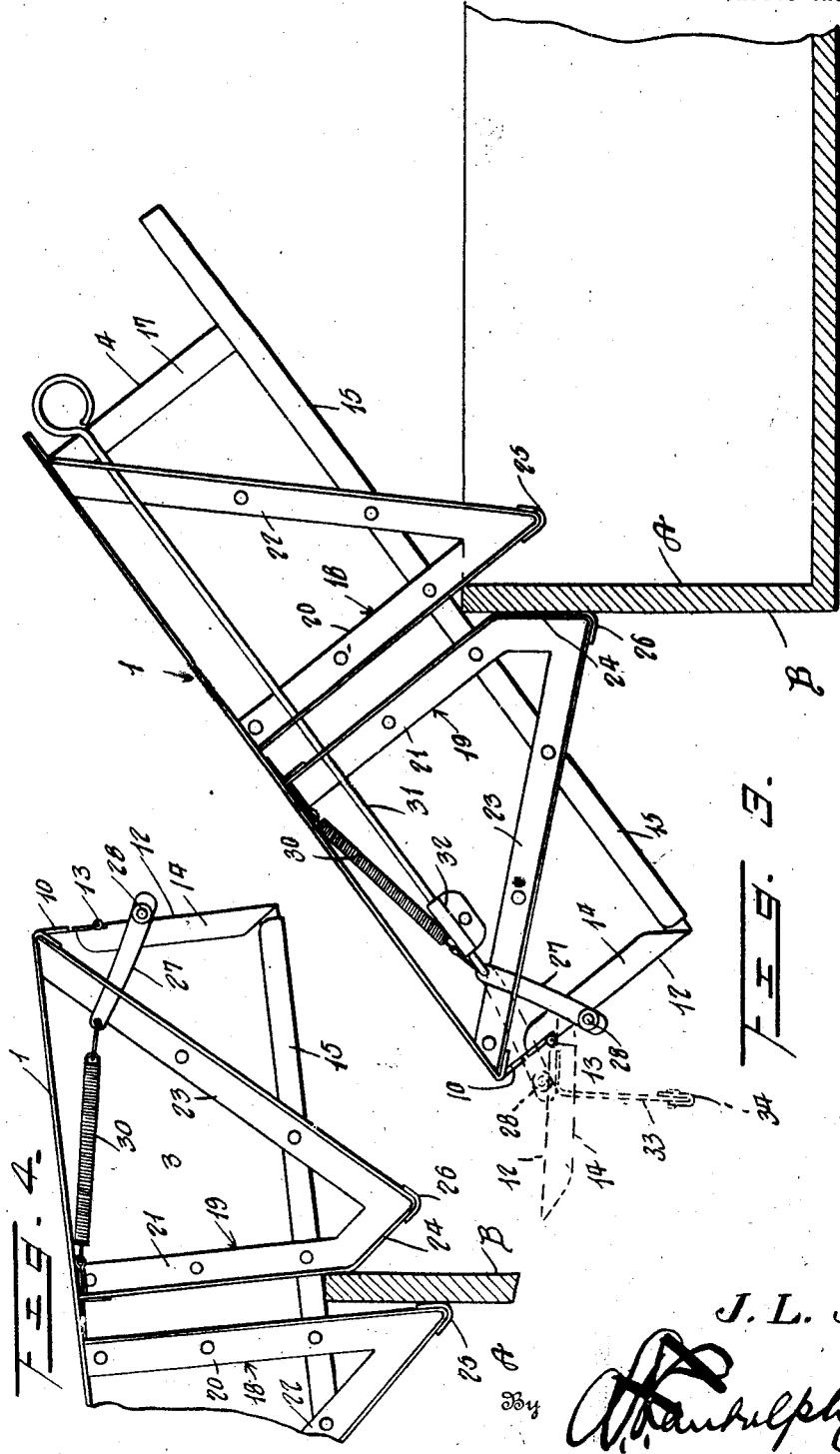
Inventor  
J. L. Shue.

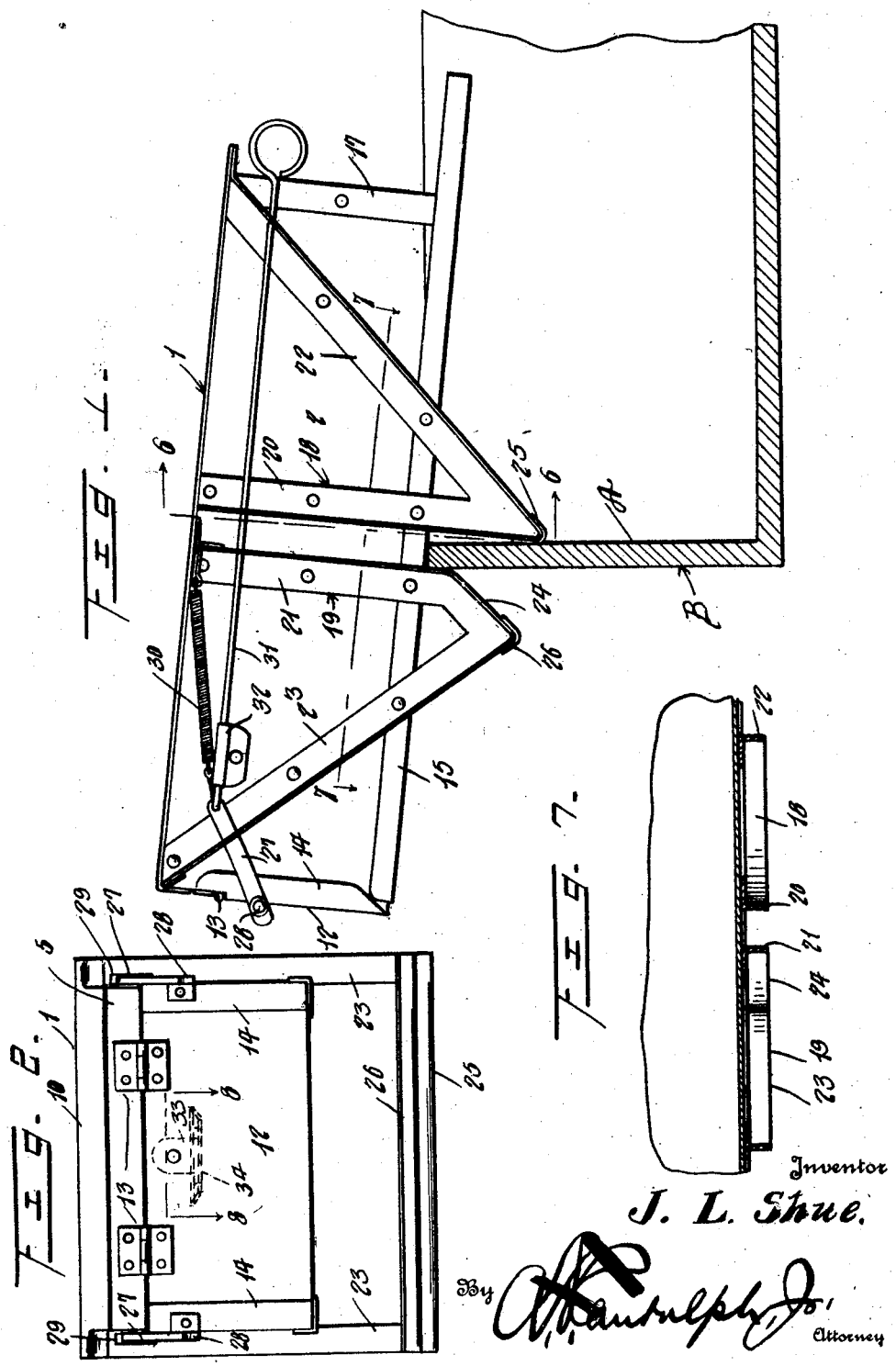

Aug. 28, 1928.　　　　　　　　　　　　　　　　1,682,354
J. L. SHUE
BATCH HOPPER FOR CONCRETE MATERIAL
Filed Jan. 27, 1927　　　3 Sheets-Sheet 3
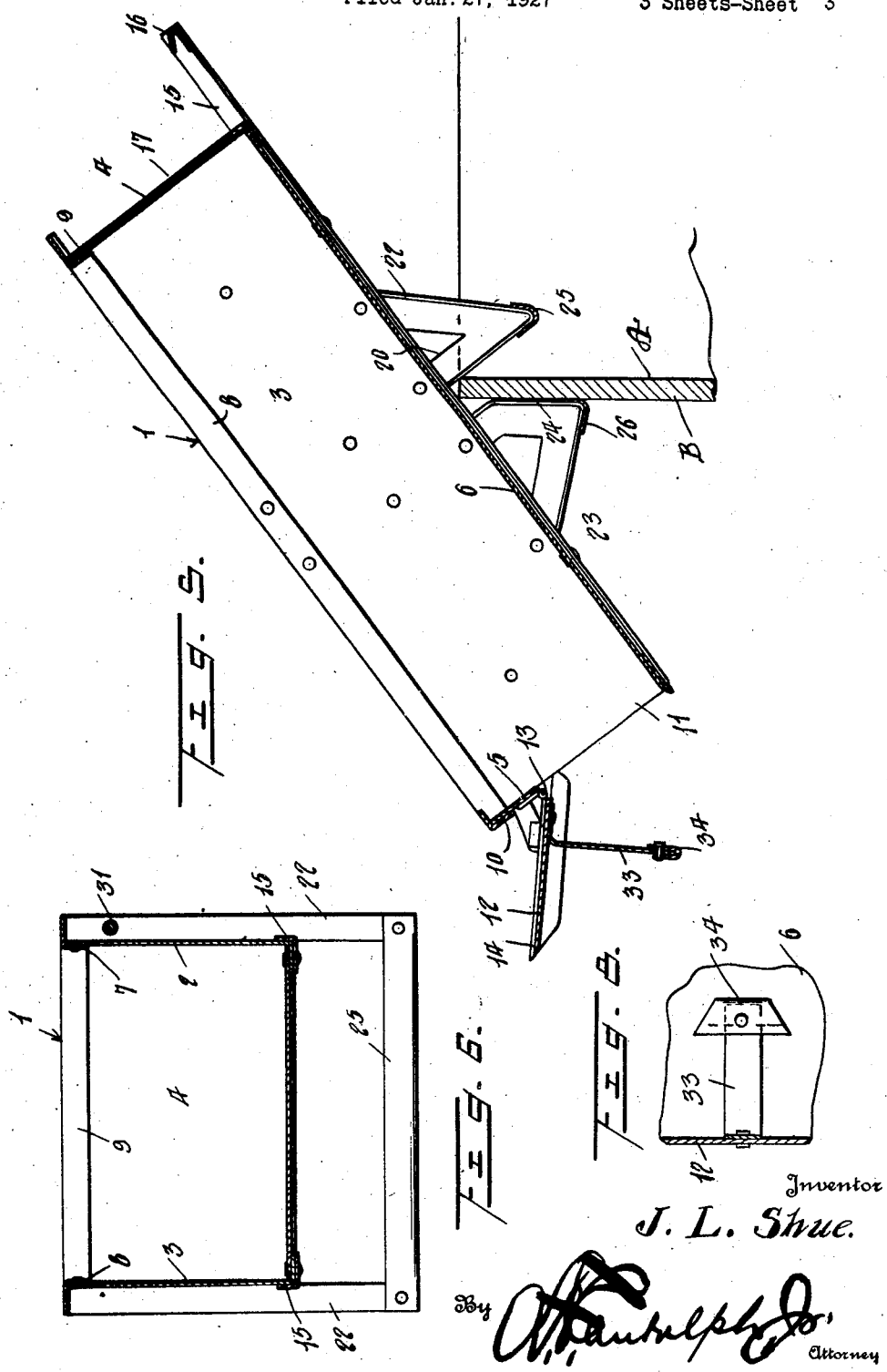
Inventor
J. L. Shue.
Attorney Patented Aug. 28, 1928.

1,682,354

UNITED STATES PATENT OFFICE.

JOHN L. SHUE, OF SHAWNEE, OKLAHOMA.

BATCH HOPPER FOR CONCRETE MATERIAL.

Application filed January 27, 1927. Serial No. 164,099.

The invention relates to means for unloading freight cars of sand, gravel, and other material into trucks.

Trucks commonly employed for material of this character, used in mixing concerete, are provided with transverse partitions dividing the truck into what is commonly known as batches so that if desired a part of the load may be dumped at one place and another at another place, or as is commonly the practice, sufficient of the material is carried in each batch to make one mixing of the concrete in a concrete mixing machine. The common practice in unloading freight cars, in case of large jobs, is to employ an unloading apparatus of the clam shell type, but where the jobs are smaller, an unloading apparatus is usually employed that may be secured to and detached from the freight car and employing a hopper to be filled by shovelers in the car, the hopper to be dumped into the truck. The invention that is the subject matter of this application is of the latter type.

The object of the invention is the provision of an improved means for unloading freight cars comprising a container adapted to be mounted on the side of the freight car and having brackets extending downwardly from the two sides thereof and spaced apart to receive the side of the freight car, the distance between the brackets being greater than the thickness of the freight car sides, and the bracket on the outer side of the freight car having portions inclined away from the other bracket to permit the container assuming the dumping position, the construction being such, however, that the container when in the position ready to be loaded will have the center of gravity toward the interior of the freight car to hold the container in position to receive the load.

Another object of the invention is the provision of a batch hopper that is so constructed that it may be readily mounted on and removed from the side of the freight car and into the body of the car when it is required to shift the car from place to place while being unloaded, whether the hopper is empty or partly loaded, the material in the hopper not being wasted in moving it from its position on the side of the car. Furthermore, the hopper is so constructed that it may be slid longitudinally of the car side into convenient position for shovelers in filling the hopper as one end of the car may be emptied, and furthermore as the hopper extends inwardly of the car the labor of the shovelers in filling the hopper is reduced to a minimum.

A further object of the invention is the provision of an attachment to the gate closing the dumping opening comprising a T-shaped arm having the cross head interiorly of the hopper so that the arm will be engaged by the material in the hopper when the hopper is dumped to insure opening the gate to the widest extent. Furthermore, provision is made including links pivotally engaging the gate and springs engaging the links and the sides of the hopper to hold the gate in a closed or an open position.

The invention will be described in detail hereinafter and will be found illustrated in the accompanying drawings, in which Figure 1 is a side view in elevation of the improved batch hopper showing it in position on the side of a freight car, shown in section.

Figure 2 is a rear view of the hopper,

Figure 3 is a view similar to Figure 1 showing the hopper in dumping position, the gate being shown in its open position in broken lines, Figure 4 is a fragmental view of the other side of the hopper from that shown in Figure 1, and in the same position as Figure 1, ready to be loaded.

Figure 5 is a central longitudinal sectional view of the hopper,

Figure 6 is a transverse sectional view on a plane indicated by the line 6—6 of Figure 1, Figure 7 is a fragmental sectional view on a plane indicated by the line 7—7 of Figure 1, and Figure 8 is a detail sectional view on a plane indicated by the line 8—8 of Figure 2.

In the drawings similar reference characters will be used to designate corresponding parts throughout the several views.

The batch hopper comprises a container 1 having the sides 2 and 3, the front end 4, and the rear or dumping end 5, 6 being the bottom of the hopper. The upper edges of the side members 2 and 3 are reinforced by angle plates 7 and 8, having one of their flanges secured on the inner side of the respective side members, while the other flange extends outwardly of the side members. 9 is an angular plate secured to the upper edge of the front member 4 and having its flange extending outwardly of the front member 4, the other flange being secured to the inner side of the member 4. The rear member 5 is reinforced by an angular plate 10 having one of its flanges secured to the outer side of the upper edge of the member and its other flange extending inwardly of the container 1, as distinctly shown in Figure 5.

The rear member 5 is provided with a dumping opening 11 and 12 is a gate hinged as shown at 13 to close the dumping opening 11, said gate having its end provided with plates 14 secured to the outer side thereof and having one of their flanges turned inwardly to overlap the sides 2 and 3 when the gate is in a closed position. 15 are angle beams to strengthen the angle between the sides 2 and 3 and the bottom 6, said beams extending forwardly of the front end 4 of container and having a cross bar 16 connecting said extended end and forming a handle to operate the hopper into dumping and loading position and also to assist in handling the hopper in mounting and dismounting it on the side of the freight car. 17 represent angle plates to strengthen the angles formed by the sides 2 and 3 and the front member 4. Secured to the sides 2 and 3 are angular brackets 18 and 19 having vertical members 20 and 21 respectively and inclined members 22 and 23 respectively. Said brackets extend below the bottom of the hopper 6, and are spaced apart a greater distance than the thickness of the side members A of the freight car B so that when the hopper assumes the position shown in Figures 1 and 4, the center of gravity of the hopper is toward the interior of the freight car to hold it in position to receive the load. The brackets 19 have their lower portions formed with faces 24 inclined at an angle to the member 21 to permit the hopper to assume a dumping position shown in Figures 3 and 5. 25 indicates a channel bar connecting the angles formed by the members 20 and 22 of the brackets 18, and 26 is a channel bar connecting the angles formed by the members 23 and 24 of the brackets 19.

Links 27 are pivotally secured as shown at 28 to the gate 12 and are slidably mounted in slots 29 in members 23 of the brackets 19, 30 indicating springs secured to the members 21 of brackets 19 and to the links 27 and operating to hold the gate 12 in either a closed or open position as shown in Figures 1 and 3. 31 is a rod slidably mounted in the members 20 and 23 of bracket 18 and member 21 of bracket 19 and in a tubular member 32 secured to side member 2 and secured to one of the links 27, said rod being adapted to be manually operated to close the gate 12 should it not close by gravity when the hopper is moved into the position shown in Figure 1. Gate 12 will be opened by the weight of the material in the hopper when it is moved into dumping position shown in Figures 1 and 3, and to insure opening of the gate to its widest extent an arm 33 is secured to the face of the gate and has a cross head 34, said arm and cross head being engageable by the material in the hopper to insure complete opening of the gate.

The operation of the device has heretofore been explained in connection with the description of the different parts of the invention, but it is proper to state some of the advantages that the invention has. The principal advantage of the invention is the ease with which it can be placed in position on the side of the freight car, and adjusted along the side of the car as the car is unloaded, and as heretofore stated because of the fact that one-half of the container extends into the car when in a loading position the shovelers in the car can fill the container without trouble. Another feature is that when the hopper is in loading position as shown in Figure 1, the dumping end of the container is sufficiently high above the ground to permit trucks that are to be loaded to be driven directly under the hopper. Because of its balanced construction the hopper is readily tipped to dump the load therefrom and the weight of the material in the hopper serves to open the gate 12 as heretofore stated. Should it be desired to regulate the speed of unloading of the hopper, this may be done by the operator of the car regulating the pitch of the hopper by grasping the handle on the front end thereof.

What is claimed is:—

1. A batch hopper for concrete material, comprising a container adapted to be mounted on the side of an open freight car, brackets secured to the container and extended below its bottom, said brackets being in pairs and adapted to be arranged on opposite sides of the freight car side, the brackets of each pair spaced from one another a greater distance than the thickness of the side of the freight car, and a bracket of each pair having a portion inclined from the other bracket, said inclined portion being adapted to engage the adjacent face of the side of the freight car to incline the container relatively to the car side.

2. A batch hopper for concrete material, comprising a container adapted to be mounted on the side of an open freight car, angular brackets secured to the sides of the container, extending below its bottom and adapted to be arranged on opposite sides of the freight car side, said brackets on each side of the container being spaced from one another a greater distance than the thickness of the side of the freight car, and the brackets to engage the outer face of the freight car side having a portion inclined away from the other brackets, said inclined portion to seat against the outer face of the car side when the container is in dumping position.

3. A batch hopper for concrete material, comprising a container adapted to be mounted on the side of an open freight car, brackets secured to the sides of the container, extending below its bottom and adapted to be arranged on opposite sides of the freight car side, said brackets being spaced from each other on each side of the container a greater distance than the thickness of the car side to permit tipping of the container into and out of the freight car, and the brackets on the outer side of the car side having a portion inclined from the other brackets to engage the car side when the container is tipped outwardly.

4. In combination with a hinged gate of a dumping container, an arm secured to the gate and extending inwardly of the container at right angles to the gate for engagement by the material in dumping the container to insure completely opening the gate.

5. In combination with a hinged gate of a dumping container, a T-shaped arm secured to the gate and extending inwardly of the container at right angles to the gate for engagement by the material in dumping the container to insure complete opening of the gate.

6. In a dumping container, a gate hingedly secured thereto, a link pivotally engaging the gate and slidable on the container, and a contractile spring member engaging said link and suitably secured and stressed to hold the gate in closed and fully open positions.

In testimony whereof I affix my signature.

JOHN L. SHUE.